US006973335B2

(12) United States Patent
Ganton

(10) Patent No.: US 6,973,335 B2
(45) Date of Patent: Dec. 6, 2005

(54) SYSTEM AND METHOD FOR PERSONAL AREA NETWORK (PAN) DISTRIBUTED GLOBAL OPTIMIZATION

(75) Inventor: Robert Bruce Ganton, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 520 days.

(21) Appl. No.: 10/072,174

(22) Filed: Feb. 6, 2002

(65) Prior Publication Data

US 2003/0190938 A1    Oct. 9, 2003

(51) Int. Cl.[7] ................................................ H04Q 7/20
(52) U.S. Cl. .................. 455/573; 455/574; 455/343.4; 455/343.5; 455/41.1; 455/41.2; 702/62
(58) Field of Search ............................... 455/573, 574, 455/343.4, 343.5, 41.1, 41.2; 702/62

(56) References Cited

U.S. PATENT DOCUMENTS

| 6,104,913 | A | * | 8/2000 | McAllister ................. 455/41.1 |
| 6,640,268 | B1 | * | 10/2003 | Kumar ......................... 710/46 |
| 6,671,525 | B2 | * | 12/2003 | Allen et al. .................. 455/574 |
| 6,795,688 | B1 | * | 9/2004 | Plasson et al. ............. 455/41.2 |
| 2004/0083066 | A1 | * | 4/2004 | Hayes et al. .................. 702/62 |

* cited by examiner

Primary Examiner—Temica Beamer
Assistant Examiner—Julio Perez

(57) ABSTRACT

A system and method are presented for actively evaluating and adjusting device energy consumption in a personal area network (PAN). The method comprises: polling devices in the PAN to determine respective energy metrics; and, establishing network communications between devices using the energy metrics. More specifically, a master device establishes network communications rules between the devices as a result of the polling activity. The master device identifies energy metrics including the battery charge status for devices powered by battery and device link energy metrics associated with network link communication operations, determines the priority of operation for the devices, and optimizes device battery life in response to the energy metrics and the priority of operation for the devices. In a specific example of the invention, a Bluetooth network, the method comprises: establishing a piconet with one device functioning as a master device and at least one other device functioning as a slave device; polling devices to determine respective energy metrics; the master device identifying energy metrics including the battery charge status and device link energy metrics; the master device determining the priority of operation for the devices; the master device optimizing device battery life in response to the energy metrics and the priority of operation for the devices by modifying link states between devices, the link state including device scan rate, device mode setting, and device network role.

21 Claims, 4 Drawing Sheets

SYSTEM AND METHOD FOR PERSONAL AREA NETWORK (PAN) DISTRIBUTED GLOBAL OPTIMIZATION

BACKGROUND OF THE INVENTION

1. Field of the Invention

This invention generally relates to devices communicating on a Personal Area Network (PAN), and more particularly, to a system and method for actively evaluating and adjusting device energy consumption in a PAN, such as a Bluetooth wireless communications network.

2. Description of the Related Art

A PAN is a collection of mobile and desktop electronic devices in a home, personal, or business setting using wireless technology to exchange data and voice over short distances. Bluetooth wireless communications networks are one method for implementing PANs. As described in U.S. patent application No. 20010005368, filed Jun. 28, 2001 (Johan Rune), Bluetooth is a specification for wireless communications using a frequency hopping scheme as the access method. The wavelengths used are located in the unlicensed 2.4 GHz, Industrial Scientific Medical (ISM) band. In the following disclosure, the term Bluetooth wireless communications network means a wireless communications network having the capability of operating according to the Bluetooth specification.

The original intention of the Bluetooth specification was to eliminate cables between devices such as telephones, Personal Computer (PC) cards, and wireless headsets by supporting communication over a radio interface. Today, the Bluetooth specification defines a true ad hoc wireless network intended for both synchronous traffic (e.g., voice) and asynchronous traffic (e.g., Internet Protocol (IP) based data). The intention, in a PAN, such as Bluetooth, is that commodity devices, such as telephones, Personal Digital Assistants (PDAs), laptop computers, digital cameras, video monitors, printers, and fax machines will be able to communicate over the radio interface by means of hardware and associated software designed according to a standard specification.

FIG. 1 depicts a Bluetooth point-to-point piconet and a Bluetooth point-to-multipoint piconet (prior art). Two or more Bluetooth devices that share the same channel form a piconet. That is, a piconet is a collection of devices connected via Bluetooth wireless technology in an ad hoc fashion. Within a piconet a Bluetooth device can have either of two roles: master or slave. Within each piconet there is typically only one master, and at least one active slave device. A master device is the device in a piconet whose clock and address are used to synchronize all other devices in the piconet. The Bluetooth system supports both point-to-point and point-to-multi-point connections. Accordingly, there may be up to seven active slave devices in a piconet. That is, a piconet starts with two connected devices, such as a portable PC and a cellular telephone, and may grow to eight connected devices. Typically, Bluetooth devices are peer units and have identical implementations. Typically, each Bluetooth device can become the master in a piconet. However, when establishing a piconet, one device acts as a master, and the other device or devices act as slaves for the duration of the piconet connection.

FIG. 2 depicts a Bluetooth scatternet with two Bluetooth piconets (prior art). A scatternet is a network including multiple independent and non-synchronized piconets. The connection point between two piconets consists of a Bluetooth device that is a member of both piconets. A Bluetooth device can simultaneously be a slave member of multiple piconets, but only a master in one piconet. That is, a Bluetooth device functioning as the master in one piconet can act as a slave in another piconet. A Bluetooth unit can only transmit and receive data in one piconet at a time, so participation in multiple piconets has to be on a time division multiplex basis. Several piconets can be established and linked together ad hoc, where each piconet is identified by a different frequency hopping sequence. All users participating in the same piconet are synchronized to this hopping sequence. The scatternet topology can best be described as a multiple piconet structure.

Many of the devices that can be connected in a PAN are battery powered, or have the option of being battery powered (e.g., telephones, PDAs, laptop computers, and digital cameras). The portability and efficient information transfer without cabling constrains afforded to devices by battery power is a key benefit of PANs. Batteries, however, have limited charge capacity. Battery-powered devices in a PAN have two general types of energy consumption: inherent functions, and communications and control functions associated with operations in the PAN. Inherent functions are functions associated with the purpose of the device. For example, the inherent function of a wireless headset involves communication of audio data between the headset and a communicating telephone. One example of control and communication functions in a PAN, in this case a Bluetooth wireless communications network, is the polling of slave devices by a master device.

Continuing the use of a Bluetooth network as an example, the master device polls the slave devices periodically to confirm that the slave devices are on line and to facilitate data transfer. This polling (scan rate) varies according to the number and type of other devices with which a given device must communicate. In general, a given device is supplied with rules determining with which other devices it will communicate. For example, a portable headset may be configured to communicate with telephones, but not with PDAs or printers. This factor determines the number of polling operations required. The scan rate for a given polling operation depends on the communication requirements of the devices involved. For example, a headset and telephone connection may use a relatively high scan rate to ensure timely transmission of voice data, whereas a PDA and PC connection may use a lower scan rate to exchange email updates. Devices that are polled more often (higher scan rates) consume more energy.

An additional factor that may be relevant for determining scan rates is the possibility of using manual override functions selected by the device user. These functions could establish optional device operations (e.g., connecting a telephone to a computer to enable the telephone to access email), or could enhance the performance of existing connections (e.g., increasing the scan rate between a telephone and a PC to enable more frequent updates of email from the PC). In either case, energy consumption would increase because additional polling is introduced or the scan rates are accelerated.

The factors noted above determine the scan rate and mode setting and, hence, the energy consumption associated with communication and control operations for devices in a Bluetooth communications network. The energy consumption associated with communication and control operations and with the inherent functions of devices in the network act to reduce the time that battery-powered devices can operate in the network, and therefore, limit the functionality of the network. The Bluetooth specification does not particularly address the issue of battery energy conservation.

It would be advantageous if devices in a PAN could operate in a state that permitted longer battery life.

SUMMARY OF THE INVENTION

The present invention addresses energy management problems associated with the operation of battery-powered devices in a personal area network (PAN). In one specific implementation, the present invention operates in a Bluetooth wireless communications network. The invention recognizes that battery power capacity is a limitation in a PAN. The invention addresses this problem by determining energy metrics related to device battery capacity and energy consumption, and providing network communications to minimize energy consumption for devices with low energy metrics.

Accordingly, a method is presented for actively evaluating and adjusting device energy consumption in a PAN. The method comprises: polling devices in the PAN to determine respective energy metrics; and, establishing network communications between devices using the energy metrics. More specifically, a master device establishes network communications rules between the devices as a result of the polling activity. The master device identifies energy metrics including the battery charge status for devices powered by battery and device link energy metrics associated with network link communication operations, determines the priority of operation for the devices, and optimizes device battery life in response to the energy metrics and the priority of operation for the devices.

In a specific example of the invention, a Bluetooth network, the method comprises: establishing a piconet with one device functioning as a master device and at least one other device functioning as a slave device; polling devices to determine respective energy metrics; the master device identifying energy metrics including the battery charge status and device link energy metrics; the master device determining the priority of operation for the devices; the master device optimizing device battery life in response to the energy metrics and the priority of operation for the devices by modifying link states between devices, the link state including device scan rate, device mode setting, and device network role.

The use of the present invention method extends the lifetime of PAN devices with limited battery capacity, and in turn, extends the full scope and capabilities of the PAN as a whole. Additional details of the above-described method, and a system for actively evaluating and adjusting device energy consumption in a PAN are presented below.

DETAILED DESCRIPTION OF THE PREFERRED EMBODIMENTS

Figure 1:
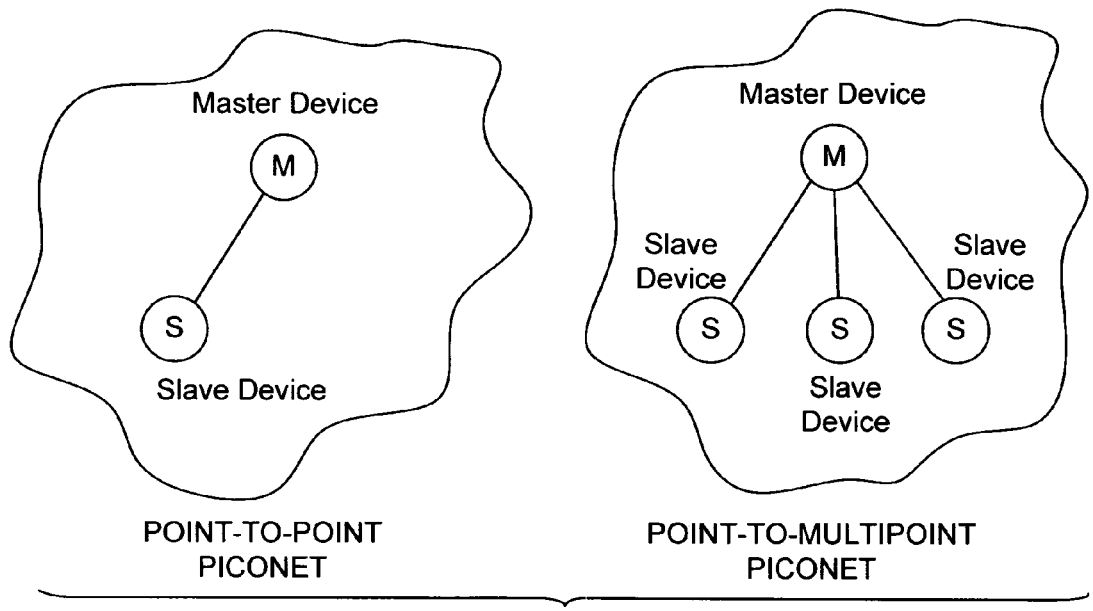
FIG. 1 depicts a Bluetooth point-to-point piconet and a Bluetooth point-to-multipoint piconet (prior art).
Figure 2:
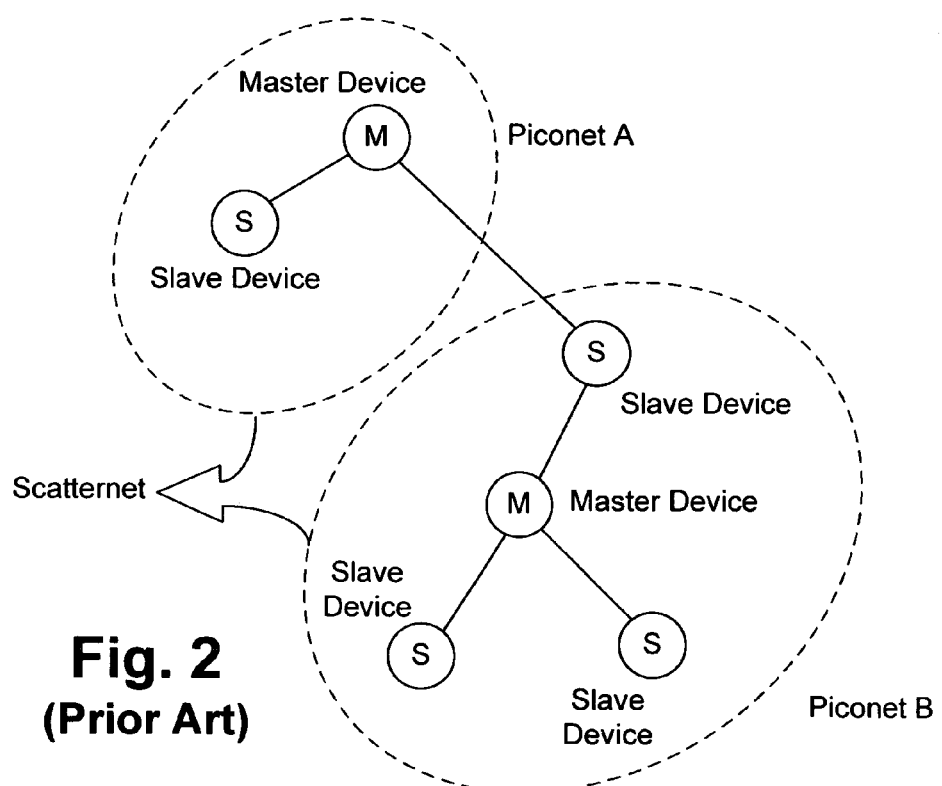
FIG. 2 depicts a Bluetooth scatternet with two Bluetooth piconets (prior art).
Figure 3:
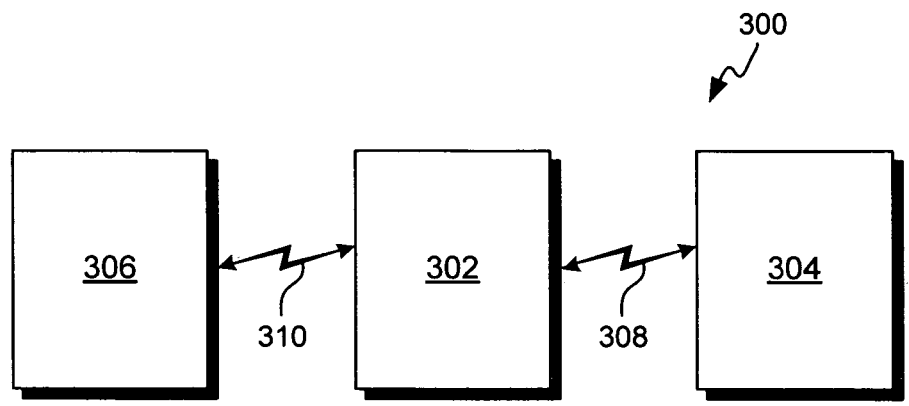
FIG. 3 is a schematic block diagram depicting the system for actively evaluating and adjusting device energy consumption in a personal area network (PAN) in accordance with the present invention.

FIG. 3 is a schematic block diagram depicting the system 300 for actively evaluating and adjusting device energy consumption in a personal area network (PAN) in accordance with the present invention. Shown are devices 302, 304, and 306, communicating in a wireless communications network. However, the invention is not limited to any particular number of devices. A first device 302 polls the other devices 304 and 306 to determine respective energy metrics and establishes network communications between device 302 and devices 304 and 306 responsive to the energy metrics. The first device 302 establishes network communications between devices 304 and 306 to minimize energy consumption for devices with low energy metrics. The parameters involved in determining low energy metrics are explained below. The polling and network communications are accomplished through wireless communications represented by reference designators 308 and 310. Although the PAN may be a Bluetooth compliant network (as described below), it will be appreciated that the use of the present invention system in other communication networks would be consistent with this disclosure.

Figure 4:
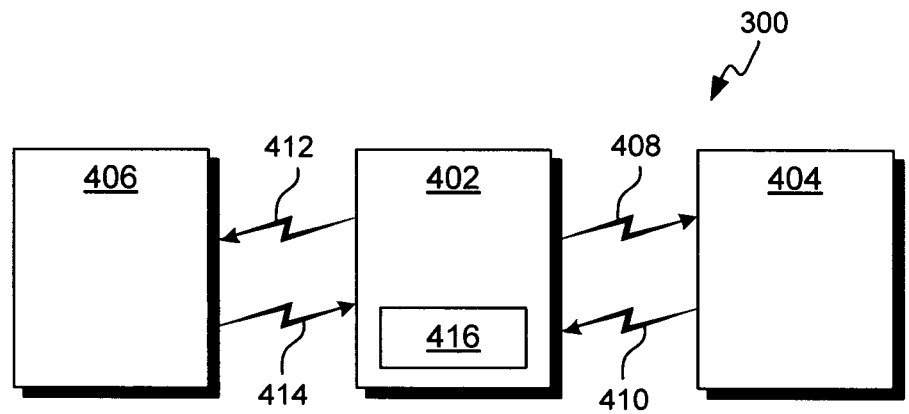
FIG. 4 is a schematic block diagram depicting the system of FIG. 3 in further detail.

FIG. 4 is a schematic block diagram depicting the system 300 of FIG. 3 in further detail. A plurality of devices (shown are devices 402, 404 and 406) communicate in a Bluetooth wireless communications piconet. The first device 402 functions as a master device to establish network communications rules with slave devices 404 and 406. Note that the roles of the devices in the network can change, as explained above in the Background. That is, a device can be a master device in one instance and can later assume the role of a slave device while a former slave device assumes the role of the master device. This is called role switching. Role switching can occur in response to device energy metrics, for example, the capacity remaining on the device battery. Polling and network communications are accomplished through wireless communications represented by reference designators 408, 410, 412, and 414. In some aspects of the system 300, master device 402 polls slave devices 404 and 406 to receive slave device identification data, and the master device 402 retrieves energy metric data from a memory 416 in response to receiving the identification data for the slave devices 404 and 406. For example, the memory may include energy metric data for a list of popular devices, or data for devices with which the master device has recently interfaced. In some aspects of the system 300, the master device 402 polls the slave devices 404 and 406 to receive slave device energy metric data. That is, the slave devices 404 and 406 provide the energy metric data to the master device 402.

For those devices unable to support the energy metric exchange, device parameters are supplied to the master device or to the master device memory. These parameters, such as the device-type, the size of the device battery, or standard or default energy consumption, enable the master device 402 to include these devices in the network communications.

Figure 5:
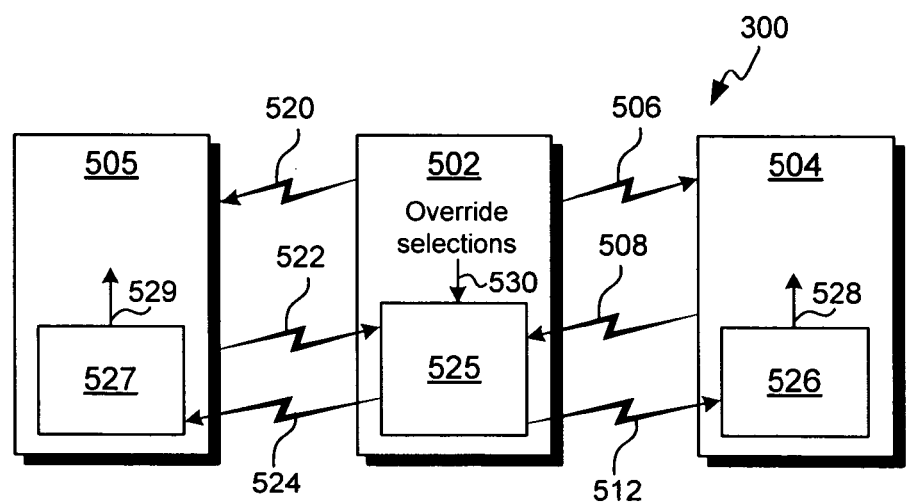
FIG. 5 is a schematic block diagram depicting the system of FIG. 4 in further detail.

FIG. 5 is a schematic block diagram depicting the system 300 of FIG. 4 in further detail. Shown are devices 502, 504, and 505. Polling and network communications are accomplished through wireless communications represented by reference designators 506, 508, 512, 520, 522 and 524. Master device 502 has a calculator 525 accepting slave device energy metrics. Master device 502 supplies energy consumption rules to optimize device battery life in response to the slave device energy metrics. Slave devices 504 and 505 each have a controller, 526 and 527 respectively, accepting the energy consumption rules. The controllers 526 and 527 supply outputs on lines 528 and 529 respectively, for controlling energy use in accordance with the energy consumption rules.

Energy metrics are parameters associated with the available energy in a battery-powered device and the energy demands on the device. Low energy metrics describes a state in which the available energy has reached an undesirably low level with respect to the energy demands. That is, the ability of the device to meet its energy demands is reaching or has reached a level where action may be required to preserve the desired operation of the device. Possible energy demands are explained in further detail below, but include inherent operations for the device and PAN communication and control operations, such as scan rate and mode setting. The charge remaining on the battery and whether the device is connected to a battery charger are among the parameters determining the available energy in the device, as explained below.

The calculator 525 accepts energy metrics for slave devices 504 and 505, including a battery charge status for those devices powered by battery. The battery charge status includes the charge remaining on the battery and whether the device is connected to a battery charger. The battery charge status also may include the size or capacity of the battery. The calculator 525 also determines a priority of operation for devices in the network and supplies energy consumption rules to optimize device battery life in response to device battery charge status and device priority of operation. For example, the priority of operation for a critical wireless phone may dictate that an energy consumption rule be set to maximize the battery lifetime for the wireless phone at the expense of other battery powered devices. In this manner, the more critical device, the wireless phone for example, could be given an energy priority over a less critical device, such as a portable music player.

Optimizing battery lifetimes includes extending and equalizing battery lifetimes. For example, a calculation is made to extend the lifetime of devices with limited capacity batteries to a lifetime more equal to the devices with greater capacity batteries (and/or a smaller energy draw). For those devices connected to chargers, the calculator 525 modifies the calculation to account for the effect of the chargers on the respective device batteries. For example, the calculation may increase the energy demands assigned to a battery connected to a battery charger. The system 300 does not necessarily act to literally make the lifetime of every battery equal, as the differences in battery size and energy use may prevent equality in battery lifetimes. Rather, equalizing battery lifetime is a system goal. Typically, the energy rules strive to minimize energy consumption for devices with less battery capacity. However, it will be appreciated that other considerations, such as priority of operation for devices, as noted above, may be used to define the energy rules.

The calculator 525 accepts slave device 504 and 505 link energy metrics for energy consumption associated with network link communications functions including receiving, transmitting, standby, required average data rate, burst data rate, peak data rate, latency requirements, scan rates, and link reliability. Calculator 525 supplies energy consumption rules to optimize device battery life in response to the link energy metrics.

One way the calculator 525 supplies energy consumption rules for optimizing device battery life is to supply rules modifying link states for slave devices 504 and 505. The link state of a device includes PAN communication and control operations such as scan rate, mode setting, and the function of the device as a slave or master in the network. Network link communications in most applications are integral functions for slave devices 504 and 505 and, therefore, cannot be included in the energy consumption rules modifying the PAN communication and control operations. For example, devices with less battery charge can reduce their scan rates to reduce energy consumption and preserve battery storage capacity or can change to a mode requiring less energy consumption. The role a device plays in the network also can affect the energy consumption of the device. For example, polling slave devices in a network may cause a master device to expend more energy than the slave devices responding to the polling. Therefore, one means for optimizing the battery life of a master device is to switch roles by assigning the master role to a slave device.

In one aspect of the system 300, the calculator 525 accepts operational energy metrics from slave devices 504 and 505 for an idle mode energy consumption rate associated with inherent functions of slave devices 504 and 505, a working mode energy consumption rate associated with inherent functions of slave devices 504 and 505, and a probability of slave devices 504 and 505 operating in the working mode. Calculator 525 supplies energy consumption rules to optimize device battery life in response to the operational energy metrics. The working mode energy consumption rate for slave devices 504 and 505 is derived from functions including communicating, displaying video images, performing calculations, printing, producing audio output, and operating motors and fans. In one aspect of the system, the calculator 525 determines an average energy consumption rate from the operational energy metric parameters and supplies energy consumption rules to optimize device battery life in response to the average energy consumption rate.

In one aspect of the system 300, the calculator 525 accepts manual override function selections supplied on line 530. In another aspect of the system (not shown), the manual override selections are entered directly into the slave devices 504 and 505 and communicated to the calculator 525. These functions could establish optional device operations (e.g., connecting a telephone to a computer to enable the telephone to access email), or could enhance the performance of existing connections (e.g., increasing the scan rate between a telephone and a PC to enable more frequent updates of email from the PC). In either case, energy metrics, for example, the link state, are affected and energy consumption would increase, because additional polling is introduced or the scan rates are accelerated. The calculator 525 supplies energy consumption rules to optimize device battery life in response to the override functions.

In one aspect of the system 300, master device 502 polls slave devices 504 and 505 to determine a network battery ratio of battery status and device priority of operation compared with the link energy metric and the operational energy metric. The master device 502 compares network battery ratios for slave devices 504 and 505 to supply energy consumption rules responsive to the overall operation of the slave devices.

Figure 6:
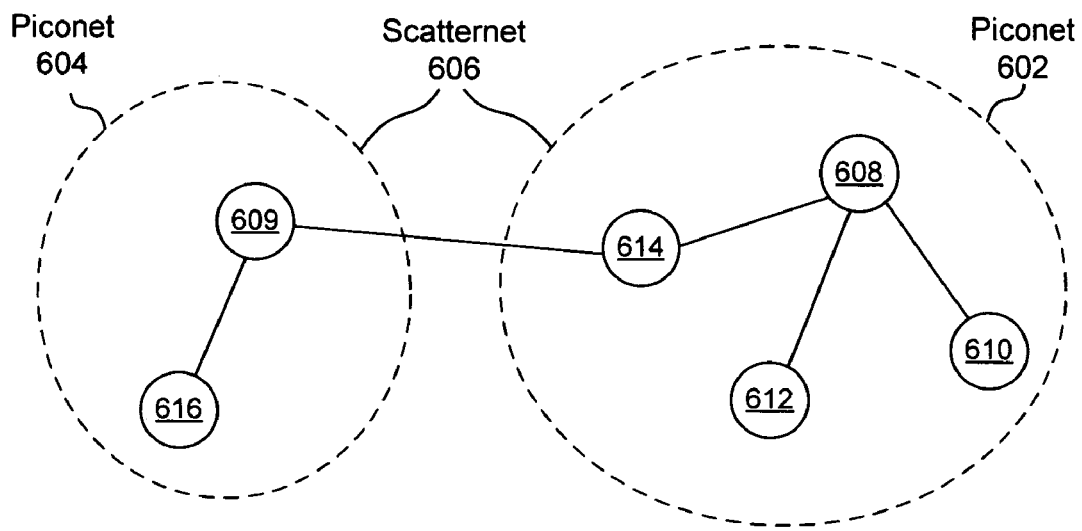
FIG. 6 is a schematic block diagram further depicting the system for actively evaluating and adjusting device energy consumption in a PAN.

FIG. 6 is a schematic block diagram further depicting the system 300 for actively evaluating and adjusting device energy consumption in a PAN. Shown are piconets 602 and 604, and devices 608, 609, 610, 612, 614, and 616. However, the invention is not limited to any particular number of piconets or devices. In one aspect of the system 300, Bluetooth wireless communications piconets 602 and 604 communicate to form a scatternet 606 and master devices 608 and 609 supply energy consumption rules in response to negotiations between piconets 602 and 604.

In a piconet environment, a master device issues energy consumption rules to slave devices in response to the energy metric data for the slave devices. However, in the scatternet 606, energy metrics are exchanged between piconet 602 and piconet 604, and in response, master devices 608 and 609 negotiate energy consumption rules that address the energy requirements of scatternet 606 as a whole, rather than the energy requirements of piconets 602 and 604 individually.

Figure 7:
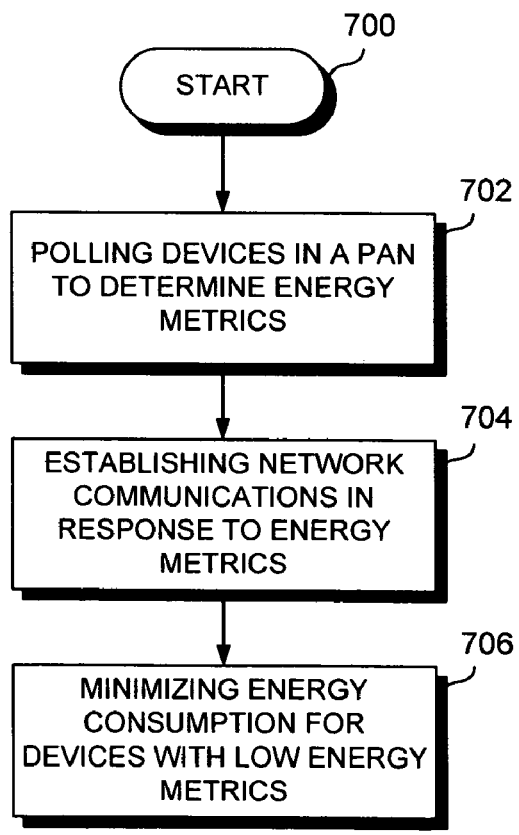
FIG. 7 is a flowchart illustrating the method for actively evaluating and adjusting device energy consumption in a PAN in accordance with the present invention.

FIG. 7 is a flowchart illustrating the method for actively evaluating and adjusting device energy consumption in a PAN in accordance with the present invention. Although the method in FIG. 7 (and FIG. 8 below) is depicted as a sequence of numbered steps for clarity, no order should be inferred from the numbering unless explicitly stated. The method starts at Step 700. Step 702 polls devices in the PAN to determine respective energy metrics. Step 704 establishes network communications between devices using the energy metrics. Step 706 minimizes energy consumption for devices with low energy metrics.

Figure 8:
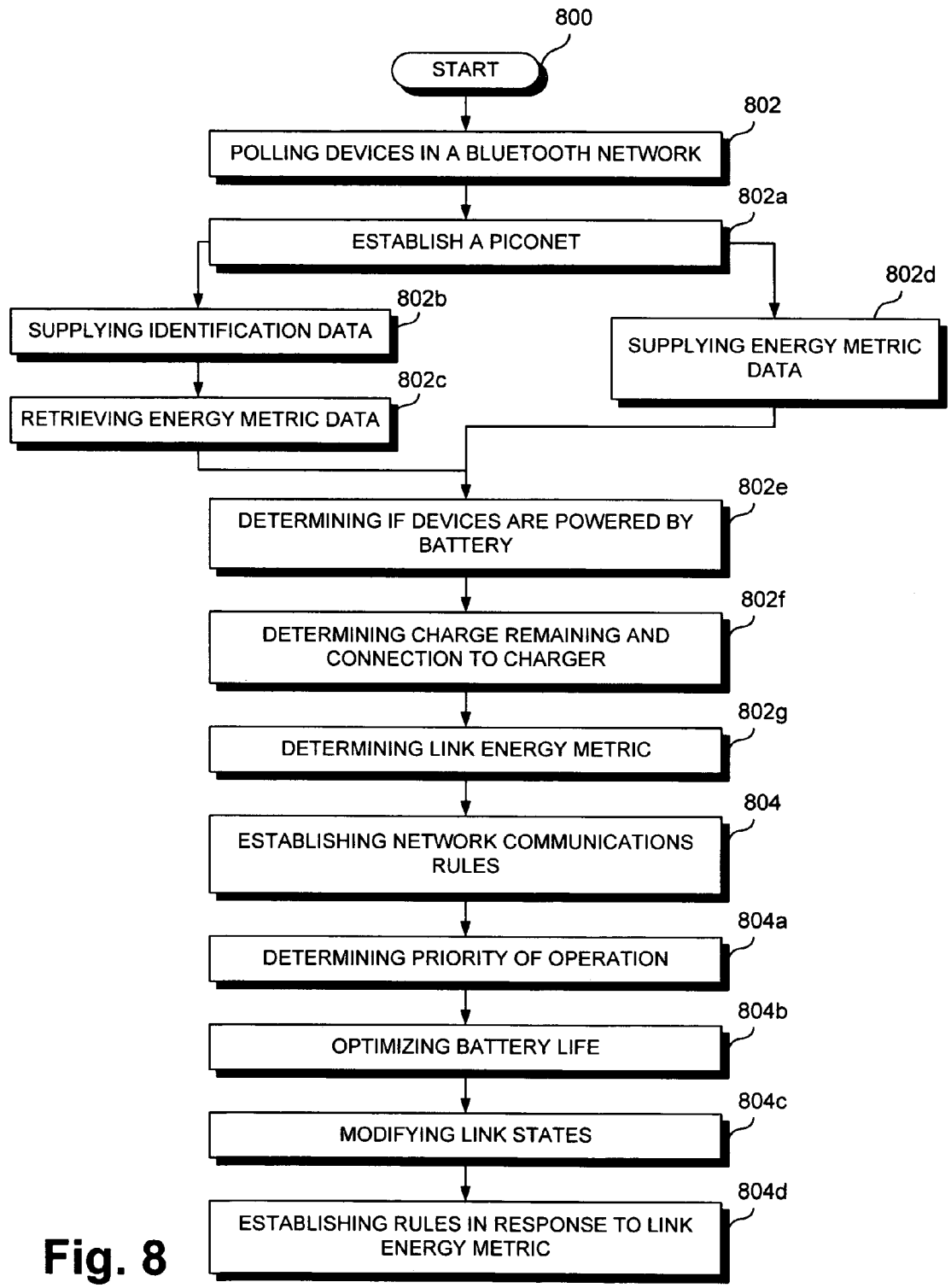
FIG. 8 is a flowchart showing in further detail the method illustrated in FIG. 7.

FIG. 8 is a flowchart showing in further detail the method illustrated in FIG. 7. The method starts at Step 800. Step 802 polls devices in a Bluetooth wireless communications network to determine respective energy metrics. Step 802*a* establishes a piconet with one device functioning as a master device and at least one other device functioning as a slave device. Step 802*e* determines if devices are powered by battery and determines a battery charge status for devices powered with batteries. Step 802*f* determines the charge remaining on device batteries and whether devices are connected to a battery charger as part of the battery charge status. Step 802*g* determines a link energy metric associated with network link communication functions selected from the group including receiving, transmitting mode, standby, required average data rate, burst data rate, peak data rate, latency requirements, scan rates, and link reliability. In Step 804 the master device establishes network communications rules between devices to optimize device battery life. Step 804*a* determines a priority for operation of the devices in the network. Step 804*b* establishes network communications rules between devices to optimize device battery life in response to device battery charge status and device priority of operation. Step 804*c* establishes network communications rules to optimize device battery life between devices by modifying link states, link states including device scan rate, device mode setting and the function of the device as a master or slave in the piconet. Step 804*d* establishes network communications rules between devices in response to the link energy metric.

In some aspects of the method, in Step 802*b*, the slave devices supply identification data to the master device. Then, in Step 802*c*, the master device retrieves from memory, in response to the slave device identification data, device energy metric data and, for those slave devices unable to support the energy metric exchange, available device data, such as device-type. Alternately, in Step 802*d*, the slave devices supply energy metric data and available device data to the master device.

In some aspects of the method, establishing a piconet with one device functioning as a master device and at least one other device functioning as a slave device in Step 802*a* includes determining an idle mode energy consumption rate associated with inherent functions of the devices, determining a working mode energy consumption rate associated with inherent functions of the devices, and determining an operational energy metric in response to a probability of the devices being in the working mode. Determining a working mode energy consumption rate in Step 802*a* includes determining energy consumption for functions selected from the group including communicating, displaying video images, performing calculations, printing, producing audio output, and operating motors and fans. Then, the master device establishing network communications rules between devices to optimize device battery life in Step 804 includes optimizing device battery life in response to the operational energy metric.

In some aspects of the method, Step 806 selects manual override functions. Then, the master device establishing network communications rules between devices to optimize device battery life in Step 804 includes establishing network communication rules in response to affects on the energy metrics associated with the manual override selections. In some aspects of the method, polling devices in a Bluetooth wireless communications network to determine respective energy metrics in Step 802 includes establishing a scatternet including at least two piconets. Then, the master device establishing network communications rules between devices to optimize device battery life in Step 804 includes establishing network communications between devices in a scatternet in response to negotiations between the piconets.

In some aspects of the method, establishing a piconet with one device functioning as a master device and at least one other device functioning as a slave device in Step 802*a* includes establishing an ad hoc point-to-multipoint piconet and an ad hoc point-to-point piconet.

In some aspects of the method, polling devices in a Bluetooth wireless communications network to determine respective energy metrics in Step 802 includes determining a network battery ratio of device battery charge status and device priority of operation compared to the combination of the link energy metric and the operational energy metric. Then, the master device establishing network communications rules between devices to optimize device battery life in Step 804 includes comparing the network battery ratios.

A system and method are presented for actively evaluating and adjusting device energy consumption in a PAN. The system and method are applicable to a wide range of equivalent networks in which battery-powered wireless devices and desktop devices communicate, but which do not necessarily meet the requirements of the Bluetooth specification. The invention is applicable to networks that are able to dynamically form ad hoc, and to those that cannot. The performance of such networks is enhanced by optimizing the energy consumption for wireless device batteries, which in turn allows the wireless devices to operate longer between battery recharges and replacements. Other variations and embodiments of the invention will occur to those skilled in the art.

I claim:

1. A method for actively evaluating and adjusting device energy consumption in a personal area network (PAN), the PAN comprising a Bluetooth wireless communications network, the method comprising:
  polling devices in the PAN to determine respective energy metrics, the polling comprising:
    establishing a piconet with one device functioning as a master device and at least one other device functioning as a slave device,
    determining if devices are powered by battery, and,
    identifying the battery charge status for each device powered by battery; and
  establishing network communications between devices using the energy metrics, the establishing network communications comprising:
    establishing network communications rules between devices, via the master device to optimize device battery life comprising:
      determining a priority of operation for the devices in the network;
      establishing network communication rules in response to device battery charge status and device priority of operation, and
    minimizing energy consumption for devices with low energy metrics.

2. The method of claim 1 wherein identifying battery charge status for each device powered by battery includes:
  determining the charge remaining on the device batteries; and,
  determining whether the device is connected to a battery charger.

3. The method of claim 2 wherein the master device establishing network communications rules between devices to optimize device battery life includes modifying a device link state; and,
  wherein modifying the device link state includes modifying device scan rate, device mode setting, and the function of the device as a stave or master in the piconet.

4. The method of claim 3 wherein polling devices in a Bluetooth wireless communications network to determine respective energy metrics includes determining a link energy metric associated with network link communication functions selected from the group including receiving, transmitting mode, standby, required average data rate, burst data rate, peak data rate, latency requirements, scan rates, and link reliability.

5. The method of claim 4 wherein the master device establishing network communications rules between devices to optimize device battery life includes establishing network communication rules in response to the link energy metric.

6. The method of claim 5 wherein polling devices in a Bluetooth wireless communications network to determine respective energy metrics includes:
  determining an idle mode energy consumption rate associated with inherent functions of the devices;
  determining a working mode energy consumption rate associated with inherent functions of the devices;
  determining an operational energy metric in response to a probability of the devices being in the working mode; and,
  wherein the master device establishing network communications rules between devices to optimize device battery life includes establishing network communication rules in response to the operational energy metric.

7. The method of claim 6 wherein determining a working mode energy consumption rate includes determining energy consumption for functions selected from the group including communicating, displaying video images, performing calculations, printing, producing audio output, and operating motors and fans.

8. The method of claim 7 further comprising:
  selecting manual override functions including establishing optional device operations and enhancing the performance of existing device operations; and,
  wherein the master device establishing network communications rules between devices to optimize device battery life includes establishing network communication rules in response to the manual override selections.

9. The method of claim 7 wherein polling devices in a Bluetooth wireless communications network to determine respective energy metrics includes determining a network battery ratio, the network battery ratio comparing device battery charge status, device priority of operation, and the combination of the link energy metric and the operational energy metric; and,
  wherein the master device establishing network communications rules between devices to optimize device battery life includes comparing network battery ratios.

10. In a Bluetooth wireless communications network, a method for actively evaluating and adjusting device energy consumption, the method comprising:
  establishing a piconet with one device functioning as a master device and at least one other device functioning as a slave device;
  polling devices to determine respective energy metrics;
  determining a priority of operation for each device in the network;
  identifying a battery charge status for each device powered by battery;
  determining a link energy metric associated with network link communications; and,
  the master device modifying a link state between devices to optimize device battery life in response to the battery charge status, the device priority of operation, and the link energy metric.

11. A system for actively evaluating and adjusting device energy consumption in a personal area network (PAN), the system comprising:
  a PAN comprising a Bluetooth wireless communications piconet:
  a first device (master device) within the PAN comprising a calculator configured to accept energy metrics from other devices and supply energy consumption rules to optimize device battery life in response to the energy metrics, the master device configured to:
    poll other devices to determine respective energy metrics,
    establish network communications between devices in response to determining energy metrics and to minimize energy consumption for devices with low energy metrics,
    establish network communications rules with at least one slave device;
  a second device (slave device) within the PAN, the slave device comprises a controller configured to accept the energy consumption rules and control energy use in response to the energy consumption rules.

12. The system of claim 11 wherein the calculator accepts energy metrics from each slave device including a device battery charge status for devices powered by battery; and,
  wherein the battery charge status includes the charge remaining on the battery and whether the device is connected to a battery charger.

13. The system of claim 12 wherein the calculator determines a priority of operation for devices in the network; and,
wherein the calculator supplies energy consumption rules to optimize device battery life in response to device battery charge status and device priority of operation.

14. The system of claim 13 wherein the calculator modifies link states as part of the energy consumption rules to optimize device battery life; and,
wherein link states include device scan rate, device mode setting, and the function of the device as a slave or master in the piconet.

15. The system of claim 14 wherein the calculator accepts slave device link energy metrics for energy consumption associated with network link communications functions selected from the group including receiving, transmitting, standby, required average data rate, burst data rate, peak data rate, latency requirements, scan rates, and link reliability; and,
wherein the calculator supplies energy consumption rules to optimize device battery life in response to the link energy metrics.

16. The system of claim 15 wherein the calculator accepts operational energy metrics from the slave devices for:
an idle mode energy consumption rate associated with inherent functions of the devices;
a working mode energy consumption rate associated with inherent functions of the devices; and,
a probability of the slave devices operating in the working mode.

17. The system of claim 16 wherein the calculator supplies energy consumption rules to optimize device battery life in response to the operational energy metrics.

18. The system of claim 17 wherein the working mode energy consumption rate is selected from the group of functions including communicating, displaying video images, performing calculations, printing, producing audio output, and operating motors and fans.

19. The system of claim 18 wherein the calculator accepts manual override function selections, the manual override functions including establishing optional device operations and enhancing the performance of existing device operations; and,
wherein the calculator supplies energy consumption rules to optimize device battery life in response to the manual override selections.

20. The system of claim 18 wherein the master device polls the slave devices to determine a network battery ratio of battery charge status and priority of operation compared with the combination of the link energy metric and the operational energy metric; and,
wherein the master device supplies energy consumption rules to optimize device battery life in response to the comparison of network battery ratios.

21. In a personal area network, a system for actively evaluating and adjusting device energy consumption, the system comprising:
a first device functioning as a master device to establish network communications rules with at least one slave device in a Bluetooth wireless communications piconet;
wherein the master device has a calculator supplying energy consumption rules to minimize energy consumption for devices with low energy metrics in response to priority of operation for devices and slave device energy metric data including:
whether devices are powered by battery;
for those device powered by battery, the charge remaining on the battery and whether the device is connected to a battery charger; and,
link energy metrics for energy consumption associated with network link communications;
wherein the slave devices have controllers supplying outputs to modify slave device link states in response to the energy consumption rules; and,
wherein link states include device scan rate, device mode setting, and the function of a device as a slave or master in the piconet.

* * * * *